United States Patent [19]

Standaert

[11] Patent Number: 5,478,898
[45] Date of Patent: Dec. 26, 1995

[54] PROCESS FOR THE POLYMERIZATION OF OLEFINS AND BLOCK (CO)POLYMERS DERIVED FROM AT LEAST ONE OLEFIN

[75] Inventor: Alain Standaert, Vilvoorde, Belgium

[73] Assignee: Solvay (Société Anonyme), Brussels, Belgium

[21] Appl. No.: 247,969

[22] Filed: May 23, 1994

Related U.S. Application Data

[63] Continuation of Ser. No. 57,853, May 7, 1993, abandoned.

[30] Foreign Application Priority Data

May 13, 1992 [BE] Belgium ............... 9200439

[51] Int. Cl.$^6$ .............. C08F 2/18; C08F 4/24
[52] U.S. Cl. .............. 526/65; 526/106
[58] Field of Search .............. 526/65, 66, 106

[56] References Cited

U.S. PATENT DOCUMENTS

| | | | |
|---|---|---|---|
| 3,392,213 | 7/1968 | Berger | 260/878 |
| 3,709,853 | 1/1973 | Karaninka | 260/88.2 |
| 4,014,859 | 3/1977 | Cooper et al. | 526/65 |
| 4,077,904 | 3/1978 | Noshay et al. | 252/429 |
| 4,133,944 | 1/1979 | Cooper et al. | 526/65 |
| 4,147,849 | 4/1979 | Liu et al. | 526/106 |
| 4,170,589 | 10/1979 | Geoke et al. | 526/106 |
| 4,255,542 | 3/1981 | Brown et al. | 526/106 |
| 4,617,360 | 10/1986 | Bienfait | 526/124 |

FOREIGN PATENT DOCUMENTS

| | | |
|---|---|---|
| 0076576 | 4/1983 | European Pat. Off. . |
| 0447035 | 9/1991 | European Pat. Off. . |

Primary Examiner—Joseph L. Schofer
Assistant Examiner—Tom Weber
Attorney, Agent, or Firm—Spencer, Frank & Schneider

[57] ABSTRACT

A process for the polymerization of at least one olefin is a suspension process employing a hydrocarbon diluent such that at least 70% of the polymer formed is insoluble therein, and employs at least two polymerization reactors. The process includes introducing a first portion of the at least one olefin and a catalyst into a first reactor. The catalyst is composed of bis(cyclopentadienyl)chromium, which may be substituted, supported on an inorganic oxide support and is supplied solely into the first reactor. The at least one olefin is polymerized in the first reactor to provide a first composition composed of a polymer and the catalyst. The first composition is then drawn off from the first reactor and the first composition and another portion of the at least one olefin are introduced into a second reactor and the another portion of the at least one olefin is polymerized in the second reactor in the presence of the first composition. Further, hydrogen is introduced into at least one of the reactors at a partial pressure ranging from 0.01 to 0.50 MPa, the ratio of the hydrogen to olefin partial pressure in this reactor ranging from 0.01 to 3. Additionally, the olefin partial pressure in the at least two reactors ranges from atmospheric pressure to 5 MPa, and the polymerization in the at least two reactors is carried out at a temperature ranging from 50° to 100° C.

9 Claims, No Drawings

PROCESS FOR THE POLYMERIZATION OF OLEFINS AND BLOCK (CO)POLYMERS DERIVED FROM AT LEAST ONE OLEFIN

This is a continuation of application Ser. No. 08/057,853 filed May 7, 1993, now abandoned.

BACKGROUND OF THE INVENTION

1. Field of the Invention

The present invention relates to a process for the (co)polymerisation of olefins, in particular of ethylene, using a number of reactors arranged in series. It also relates to olefinic block (co)polymers having a polymodal molecular weight distribution and in particular to such block (co)polymers comprising ethylene, typically polyethylene.

DESCRIPTION OF THE RELATED ART

U.S. Pat. No. 3,392,213 (Shell Oil Company) describes a process for the polymerisation of olefins, according to which a number of polymerisation reactors connected in series are used, the olefin is polymerised in the presence of the catalyst in the first reactor of the series, a polymer and the catalyst are drawn off from this first reactor, they are introduced into the following reactor which is additionally supplied with the olefin, the polymerisation is continued in this reactor and in the following reactors, each supplied with olefin and with the product arising from the preceding reactor, hydrogen is introduced into one at least of the reactors and, from the last reactor, a polyolefin is recovered which has a broad molecular weight distribution. In this known process, the catalyst used is of Ziegler type and comprises a transition metal compound and an organometallic compound.

This known process requires the use of a cocatalyst (organometallic compound). The presence of a cocatalyst during the polymerisation has the consequence that the polyolefins obtained generally have a high oligomer content. Now oligomers harm the mechanical and rheological properties of polyolefins, restricting their applications due to their considerable solubility at room temperature and cause fumes when the polyolefins are used at high temperature. Moreover, with this known process, adjustment of the molecular weight distribution is not generally very precise, which does not make it possible to produce polyolefins having predetermined properties.

SUMMARY OF THE INVENTION

The invention overcomes the disadvantages of the known process described above by providing a new process which makes it possible to produce block (co)polymers having a low oligomer content and which additionally results in better precision in adjusting the melt index of the polyolefins produced. The process according to the invention consequently makes it possible to produce block (co)polymers having improved mechanical and rheological properties.

Consequently, the invention relates to a process for the (co)polymerisation of at least one olefin according to which at least two polymerisation reactors are used, a portion of the olefin is polymerised in one of the reactors in the presence of a catalyst, a composition comprising a polymer and the catalyst is drawn off from this reactor and the composition and another portion of the olefin are introduced into the other reactor, hydrogen being introduced into one at least of the reactors; according to the invention, optionally substituted bis(cyclopentadienyl)chromium, on an inorganic oxide support, is used as catalyst.

DESCRIPTION OF THE PREFERRED EMBODIMENTS

In the process according to the invention, the olefin is not critical and may, for example, contain up to 20 carbon atoms per molecule. It advantageously contains from 2 to 8 carbon atoms per molecule and comprises, for example, ethylene, propylene, 1-butene, 1-pentene, 3-methyl -1-butene, 1-hexene, 3- and 4-methyl1-pentenes, 1-octene, 3-ethyl-1-butene, 1-heptene, 1-decene, 4,4-dimethyl -1-pentene, 4,4-diethylhexene, 3,4-dimethyl-1-hexene, 4-butyl-1-octene, 5-ethyl-1-decene and 3,3-dimethyl-1-butene.

In the process according to the invention, the polymer which is drawn off from the first reactor is obtained in this reactor by polymerisation of a portion of the olefin in the presence of a catalyst.

According to the invention, the catalyst is bis(cyclopentadienyl)chromium represented by the formula $(C_5H_5)$-Cr-$(C_5H_5)$, or a substituted bis(cyclopentadienyl)chromium compound, represented by the formula $(C_5RABCD)$-Cr-$(C_5A'B'C'D'E')$, where R denotes a hydrocarbon radical having up to 20 carbon atoms, and A, B, C, D, A', B', C', D' and E' each denote a hydrogen atom or a hydrocarbon radical having up to 20 carbon atoms. The hydrocarbon radicals may be saturated or unsaturated and they may comprise, for example, aliphatic radicals such as a methyl, propyl, butyl or allyl radical, alicyclic radicals such as a cyclopentyl, cyclohexyl or cycloheptyl radical, and aromatic radicals such as a phenyl or naphthyl radical. Unsubstituted bis(cyclopentadienyl)chromium is preferably used.

Bis(cyclopentadienyl)chromium and its substituted compounds described above may be obtained by the preparation processes disclosed in the Patents U.S. Pat. No. 4,077,904 (Union Carbide Corporation) and U.S. Pat. No. 3,709,853 (Union Carbide Corporation), where it is used as a catalyst for producing polyethylene having a narrow molecular weight distribution.

In the process according to the invention, optionally substituted bis(cyclopentadienyl)chromium is deposited on a support. To this end, there may be used, for example, an inorganic oxide chosen from the oxides of silicon, aluminium, titanium, zirconium or thorium and their mixtures such as aluminium silicate, the inorganic oxides activated by fluorination and aluminium phosphate. Silica and aluminium phosphate are well suited, in particular silica. The support and the catalyst may be obtained as described in the U.S. Pat. No. 3,709,853 (Union Carbide Corporation) and U.S. Pat. No. 4,077,904 (Union Carbide Corporation).

In the process according to the invention, a plant is used comprising at least two polymerisation reactors arranged in series and connected to each other. Each reactor is supplied with olefin. The catalyst is introduced solely into the first reactor, in which the olefin is polymerised until a polymer is obtained which has the characteristics appropriate for the polymerisation conditions of this reactor. The composition arising from the first reactor and comprising the polymer obtained and the catalyst is transferred into the following reactor, preferably continuously. In this second reactor, the olefin which is introduced therein is polymerised using the catalyst arising from the preceding reactor. Hydrogen, as transfer agent adjusting the molecular weight of the polymer obtained, is introduced continuously or non-continuously into at least one of the reactors. Preferably, both the polymerisation reactors are supplied with hydrogen so that the concentration of hydrogen in the first reactor is different from the concentration of hydrogen in the second reactor. By thus using in the second reactor polymerisation conditions which are different from those used in the first reactor, the polymer produced in the second reactor has a molecular weight different from that produced in the first, and the overall polymerised product obtained combines the characteristics appropriate for the operating conditions of the first and of the second reactor. The plant may obviously comprise more than two reactors connected in series which are supplied separately with olefin and with the composition arising from the preceding reactor of the series. Preferably, two reactors arranged in series are used.

In the process according to the invention, the polymerisation process in the first reactor is selected from the solution, suspension or gas-phase processes, regardless of the choice of process used in the other reactor. It is possible, for example, to carry out the polymerisation in both reactors in the gas phase, or in the first reactor in suspension and in the second in the gas phase.

In the case of a suspension polymerisation, the latter is carried out in a hydrocarbon diluent which is inert with respect to the catalyst and to the polyolefin produced, such as liquid aliphatic, cycloaliphatic and aromatic hydrocarbons, at a temperature such that at least 50% (preferably at least 70%) of the polymer formed is insoluble therein. The preferred diluents are linear alkanes such as n-butane, n-hexane and n-heptane, or branched alkanes such as isobutane, isopentane, isooctane and 2,2-dimethylpropane, or cycloalkanes such as cyclopentane and cyclohexane, or their mixtures. The polymerisation temperature is generally chosen from 20° to 200° C., preferably from 50° to 100° C. The olefin partial pressure is most often chosen from atmospheric pressure to 5 MPa, preferably from 0.4 to 2 MPa, and more particularly from 0.6 to 1.5 MPa.

In the case of a solution polymerisation, the latter may be carried out in an inert organic diluent such as described above. The operating temperature depends on the organic diluent used and must be greater than the dissolution temperature of the polyolefin in this organic diluent, so that at least 50% (preferably at least 70%) of the polyolefin is dissolved therein. Moreover, the temperature must be sufficiently low to prevent thermal degradation of the polyolefin and/or of the catalyst. Generally, the optimum temperature is from 100° to 200° C. The olefin partial pressure is most often chosen from atmospheric pressure to 5 MPa, preferably from 0.4 to 2 MPa and more particularly from 0.6 to 1.5 MPa. It is also possible to carry out the solution polymerisation without adding diluent, the olefin itself constituting the reaction medium. In this embodiment, it is possible to use a liquid olefin under normal pressure and temperature conditions or to carry out the reaction under a pressure which is sufficient for a normally gaseous olefin to be liquefied.

In the case where the polymerisation is carried out in the gas phase, a gas stream comprising the olefin is brought into contact with the catalyst in a fluidised bed. The flow rate of the gas stream must consequently be sufficient to maintain the polyolefin in fluidisation and depends on the rate of formation of the latter and on the rate at which the catalyst is consumed. The olefin partial pressure may be lower than or greater than atmospheric pressure, the preferred partial pressure being from atmospheric pressure to approximately 7 MPa. A pressure from 0.2 to 5 MPa is generally well suited. The choice of temperature is not critical and the latter is generally from 30° to 200° C. It is optionally possible to use a dilution gas, which must be inert with respect to the olefin.

In the process according to the invention, each reactor is supplied with olefin and at least one of the reactors is supplied with hydrogen. The hydrogen partial pressure in the reactor is advantageously from 0.01 to 0.50 MPa, more particularly from 0.015 to 0.40 MPa and preferably from 0.018 to 0.35 MPa, the ratio of the hydrogen to olefin partial pressures not exceeding 3, generally not exceeding ⅓ and being, for example, from 0.01 to 0.30.

In the process according to the invention, it is optionally possible to use a cocatalyst in addition to the bis(cyclopentadienyl)chromium.

However, it is preferred, according to an advantageous embodiment of the process according to the invention, that the catalyst consists of bis(cyclopentadienyl)chromium without cocatalyst. This embodiment has the advantage of reducing the formation of oligomers during the polymerisation.

In another embodiment of the process according to the invention, hydrogen is introduced continuously into at least one of the reactors, the ratio of the hydrogen partial pressure to that of the olefin in the reactor being constant during the time required for the production of a defined amount of polymer, and not exceeding 3, generally not exceeding ⅓. In this embodiment, the hydrogen partial pressure in the reactor is advantageously from 0.01 to 0.50 MPa, more particularly from 0.015 to 0.40 MPa and preferably from 0.018 to 0.35 MPa, and the ratio of hydrogen to olefin partial pressures is from 0.01 to 0.30.

In a preferred embodiment of the process according to the invention, both reactors may be supplied with hydrogen, the ratio of olefin to hydrogen partial pressures in the first reactor being different from that used in the second reactor. In this embodiment, it is important to maintain these ratios constant in each reactor for the duration of the polymerisation. The quotient of these two ratios is advantageously greater than 5, preferably than 10; it is desirable that it does not exceed 100, for example 80. In the case of polyethylene, a quotient from 10 to 50 may, for example, be selected.

The process according to the invention applies in particular to the polymerisation of olefin, preferably ethylene, homopolymers. The process according to the invention is also well suited to the copolymerisation of olefins, preferably of ethylene, with olefinically unsaturated comonomers comprising up to 8 carbon atoms. Diolefins comprising from 4 to 18 carbon atoms may also be copolymerised with ethylene. Preferably, the diolefins are nonconjugated aliphatic diolefins such as 4'-vinylcyclohexene and 1,5-hexadiene, or alicyclic diolefins having an endocyclic bridge such as dicyclopentadiene or methylene- and ethylidenenorbornene, and conjugated aliphatic diolefins such as 1,3-butadiene, isoprene and 1,3-pentadiene.

The process according to the invention is particularly well suited to the manufacture of ethylene homopolymers and of copolymers containing at least 90%, preferably at least 95%, by weight of ethylene. The preferred comonomers are chosen from propylene, 1-butene, 1-hexene and 1-octene.

The process according to the invention has the advantageous characteristic that it does not require the use of a cocatalyst, generally a pyrophoric product; this results in easier control of the operating parameters of the polymerisation.

The process according to the invention makes it possible to produce homopolymers and copolymers having a polymodal molecular weight distribution. These polymers comprise a number of polymer blocks each having a narrow molecular weight distribution, the mean molecular weights of the blocks being different. The process according to the invention especially makes it possible to manufacture homo- or copolymers characterised by an $M_w/M_n$ ratio from 10 to 60, where $M_w$ and $M_n$ respectively denote the weight-average molecular weight and the number-average molecular weight of the polyolefin produced.

The process according to the invention moreover makes it possible to produce polyolefins comprising at least two polymer blocks, of different melt indices, generally from 0.1 to 1,000 g/10 min. The ratio of these melt indices in the two blocks can thus reach a maximum value of 10,000. Moreover, the process according to the invention also makes it possible to produce block (co)polymers having a low oligomer content not exceeding 15% of the polyolefin weight and generally less than 7% of the polyolefin weight. It especially makes it possible to produce block (co)polymers whose oligomer content does not exceed 5% by weight and may fall to 0.5% by weight.

The invention consequently also relates to block (co)polymers, preferably comprising polyethylene, having a maximum oligomer content equal to 15% (generally from 0.5 to 5%) of its weight and a $M_w/M_n$ ratio from 10 to 60, the blocks having different melt indices from 0.1 to 1,000 g/10 min. The invention in particular relates to the (co)polymers obtained using the process according to the invention and having the characteristics stated above. Oligomers are understood to denote polymers comprising a maximum of 10 monomer units. Melt index is understood to denote that measured at 190° C. under a loading of 21.6 kg.

The (co)polymers according to the invention find a particularly advantageous use in a wide range of industrial applications as a result of combining good use properties and good mechanical properties such as impact strength and stress cracking resistance.

Examples which are described below are used to illustrate the invention. In these examples, catalysts were prepared which were then used to polymerise ethylene in suspension.

The meaning of the symbols used in these examples, the units expressing the quantities mentioned and the methods of measuring these quantities are explained below.

HLMI=melt index expressed while molten, measured under a loading of 21.6 kg at 190° C. and expressed in g/10 min according to the ASTM standard D 1238.

$M_w/M_n$=ratio of the weight-average molecular weight to the number-average molecular weight measured by steric exclusion chromatography carried out in 1,2,4-trichlorobenzene at 135° C. on a Waters type 150 C chromatograph.

$\eta_0$=dynamic viscosity expressed in Pa.s and measured at a velocity gradient of 1 $s^{-1}$ and at 190° C.

$\eta_2$=dynamic viscosity expressed in Pa.s and measured at a velocity gradient of 100 $s^{-1}$ and at 190° C.

Ol=oligomer content expressed in grams of oligomer per kilo of polyolefin and measured by extraction with hexane at its boiling temperature.

ESCR=stress cracking resistance expressed in hours and measured by the Bell method (ASTM standard D 1693).

Example 1 (in accordance with the invention)

A. Preparation of the catalyst

A solution of bis(cyclopentadienyl)chromium in toluene was prepared, which solution was then added to a predetermined amount of silica (Grace* 532 product), dehydrated under an inert atmosphere at a temperature of 815° C. for 16 h, so that the final chromium content is 1% by weight. The toluene was then removed under reduced pressure. The bis(cyclopentadienyl)chromium was then sublimed under reduced pressure onto the silica support for 5 hours. Return to atmospheric pressure was carried out under dry nitrogen and the catalyst obtained was stored with oxygen and water excluded.

B. Polymerisation of ethylene

The polymerisation process in two successive reactors was simulated in a single reactor in two stages separated by an intermediate pressure release and resetting of the operating parameters.

First stage:

90 mg of catalyst obtained in A and 1 liter of isobutane were introduced into a 3-liter autoclave, which was dried beforehand and equipped with a stirrer. The temperature was then raised to 70° C. and a single charge of hydrogen at a pressure of 0.22 MPa and ethylene were then introduced therein. The ethylene partial pressure was maintained constant at a value of 0.61 MPa during the time for the production of 140 g of polyethylene.

The autoclave was then cooled and degassed to a relative pressure of 0.05 MPa.

Second stage:

1 liter of isobutane was introduced into the autoclave. The temperature was brought to 70° C. A charge of hydrogen at a pressure of 0.01 MPa and ethylene were then introduced. The ethylene partial pressure was maintained constant at a value of 1.02 MPa until an additional amount of 140 g of polyethylene was obtained. After degassing, 280 g of polyethylene were collected from the autoclave in the form of grains. The following results were obtained:
HLMI=3.6

$M_w/M_n=57.56$
$\eta_0/\eta_2=19.4$
$Ol=5.4$.

Example 2 (in accordance with the invention)

A. Preparation of the catalyst

The catalyst was prepared by the method described in Example 1 (A).

B. Polymerisation of ethylene

The operations of Example 1 (B) were repeated under the following operating conditions:

First stage:
initial hydrogen partial pressure: 0.22 MPa
ethylene partial pressure: 0.61 MPa
amount of polyethylene produced: 425 g Second stage:
initial hydrogen partial pressure: 0.01 MPa
ethylene partial pressure: 1.02 MPa
amount of polyethylene produced in the second stage: 425 g
total amount of polyethylene produced: 850 g
The following results were obtained:
HLMI=7.3
$\eta_0/\eta_2=15.8$
$Ol=8.9$
ESCR=68.

Example 3 (for reference)

In this example, the polymerisation of ethylene was carried out using a Ziegler-type catalyst described in the U.S. Pat. No. 4,617,360 in the name of the Applicant, the operations of Example 1 (B) being repeated under the following operating conditions:

First stage:
initial hydrogen partial pressure: 0.9 MPa
ethylene partial pressure: 0.6 MPa
amount of polyethylene produced: 160 g Second stage:
initial hydrogen partial pressure: 0.02 MPa
ethylene partial pressure: 0.4 MPa
amount of polyethylene produced in the second stage: 221 g.
total amount of polyethylene produced: 381 g
The following results were obtained:
HLMI=3.9
$\eta_0/\eta_2=13.1$
$Ol=13.1$.

What is claimed is:

1. A process for the polymerization of at least one olefin, which is a suspension process employing a hydrocarbon diluent such that at least 70% of the polymer formed is insoluble therein, and which employs at least two polymerization reactors, including a first reactor and a second reactor, comprising:

(a) introducing a first portion of the at least one olefin and a catalyst into the first reactor, the catalyst comprising bis(cyclopentadienyl)chromium, which may be substituted, supported on an inorganic oxide support;

(b) polymerizing the at least one olefin in the first reactor to provide a first composition comprising a polymer and the catalyst;

(c) drawing off the first composition from the first reactor and introducing the first composition and another portion of the at least one olefin into the second reactor; and (d) polymerizing the another portion of the at least one olefin in the second reactor in the presence of the first composition, wherein hydrogen is introduced into at least one of the reactors at a partial pressure ranging from 0.01 to 0.50 MPa, the ratio of the hydrogen to olefin partial pressure in this reactor ranging from 0.01 to 3, wherein the catalyst is supplied solely into the first reactor, wherein the olefin partial pressure in the at least two reactors ranges from atmospheric pressure to 5 Mpa, and wherein the polymerization in the at least two reactors is carried out at a temperature ranging from 50° to 100 ° C.

2. The process according to claim 1, wherein the catalyst consists of bis(cyclopentadienyl)chromium, which may be substituted, on an inorganic oxide support, and contains no cocatalyst.

3. The process according to claim 1, wherein the bis(cyclopentadienyl)chromium is unsubstituted.

4. The process according to claim 1, wherein the inorganic oxide is silica.

5. The process according to claim 1, wherein hydrogen is introduced continuously into at least one of the reactors.

6. The process according to claim 5, wherein only one of the first reactor and the second reactor is supplied with hydrogen.

7. The process according to claim 5, wherein hydrogen is introduced into both the first reactor and the second reactor, wherein the hydrogen and the at least one olefin are introduced into each reactor in a ratio of respective amounts, and wherein the ratio of the amount of hydrogen to the amount of the at least one olefin in the first reactor is different form that in the second reactor.

8. The process according to claim 1, wherein the at least one olefin is ethylene.

9. The process according to claim 1, wherein the hydrocarbon diluent is at least one linear alkane selected from the group consisting n-butane, n-hexane and n-heptane.

* * * * *